United States Patent
Kitagawa et al.

(10) Patent No.: US 12,501,837 B2
(45) Date of Patent: Dec. 16, 2025

(54) MAGNETIC MEMORY DEVICE

(71) Applicant: Kioxia Corporation, Tokyo (JP)

(72) Inventors: Eiji Kitagawa, Seoul (KR); Young Min Eeh, Seongnam-si (KR)

(73) Assignee: Kioxia Corporation, Tokyo (JP)

(*) Notice: Subject to any disclaimer, the term of this patent is extended or adjusted under 35 U.S.C. 154(b) by 596 days.

(21) Appl. No.: 17/942,365

(22) Filed: Sep. 12, 2022

(65) Prior Publication Data

US 2023/0309413 A1 Sep. 28, 2023

(30) Foreign Application Priority Data

Mar. 23, 2022 (JP) ................................. 2022-046633

(51) Int. Cl.
 *H10N 50/80* (2023.01)
 *H10B 61/00* (2023.01)
 *H10N 50/10* (2023.01)
 *H10N 50/85* (2023.01)

(52) U.S. Cl.
 CPC ............. *H10N 50/80* (2023.02); *H10B 61/10* (2023.02); *H10N 50/10* (2023.02); *H10N 50/85* (2023.02)

(58) Field of Classification Search
 CPC ........ H10N 50/10; H10N 50/90; H10N 50/85; H10N 50/80; H10B 61/10
 See application file for complete search history.

(56) References Cited

U.S. PATENT DOCUMENTS

| | | | |
|---|---|---|---|
| 6,469,873 B1 * | 10/2002 | Maruyama | B82Y 25/00 |
| 6,544,801 B1 * | 4/2003 | Slaughter | H10N 50/01 |
| | | | 438/653 |
| 6,947,263 B2 * | 9/2005 | Saito | G11B 5/3909 |
| 8,841,139 B2 | 9/2014 | Kamata et al. | |
| 8,995,181 B2 | 3/2015 | Watanabe et al. | |
| 9,130,143 B2 | 9/2015 | Nagase et al. | |
| 9,142,756 B2 | 9/2015 | Nagamine et al. | |
| 9,178,137 B2 | 11/2015 | Eeh et al. | |

(Continued)

FOREIGN PATENT DOCUMENTS

JP 5480321 B2 4/2014
JP 6054326 B2 12/2016

(Continued)

OTHER PUBLICATIONS

U.S. Appl. No. 17/472,056, First Named Inventor: Tadaaki Oikawa; Title: "Magnetic Memory Device"; filed Sep. 10, 2021.

(Continued)

*Primary Examiner* — William B Partridge
*Assistant Examiner* — Alexandre X Ramirez
(74) *Attorney, Agent, or Firm* — Holtz, Holtz & Volek PC

(57) ABSTRACT

In general, according to one embodiment, a magnetic memory device includes a magnetoresistive effect element. The magnetoresistive effect element includes first to second ferromagnetic layer, a layer stack, and first to third non-magnetic layer. The layer stack is arranged on a side opposite to the first ferromagnetic layer with respect to the second ferromagnetic layer. The third non-magnetic layer is arranged on a side opposite to the second non-magnetic layer with respect to the layer stack and contains a metallic oxide. The layer stack includes a fourth non-magnetic layer being in contact with the third non-magnetic layer and containing platinum (Pt).

19 Claims, 9 Drawing Sheets

(56) References Cited

U.S. PATENT DOCUMENTS

| | | | |
|---|---|---|---|
| 9,184,374 B2 | 11/2015 | Sawada et al. | |
| 9,209,386 B2 | 12/2015 | Nagamine et al. | |
| 9,252,357 B2 | 2/2016 | Watanabe et al. | |
| 9,269,890 B2 | 2/2016 | Nakayama et al. | |
| 9,293,695 B2 | 3/2016 | Ueda et al. | |
| 9,461,240 B2 | 10/2016 | Sawada et al. | |
| 9,466,350 B2 | 10/2016 | Murayama et al. | |
| 9,608,199 B1 | 3/2017 | Kitagawa | |
| 9,620,561 B2 | 4/2017 | Nagase et al. | |
| 9,640,584 B2 | 5/2017 | Nagamine et al. | |
| 9,647,203 B2 | 5/2017 | Kitagawa et al. | |
| 9,705,076 B2 | 7/2017 | Nagamine et al. | |
| 9,741,928 B2 | 8/2017 | Ueda et al. | |
| 9,793,469 B2 | 10/2017 | Kato et al. | |
| 9,947,862 B2 | 4/2018 | Watanabe et al. | |
| 9,991,313 B2 | 6/2018 | Watanabe et al. | |
| 10,026,888 B2 | 7/2018 | Ochiai et al. | |
| 10,026,891 B2 | 7/2018 | Nagase et al. | |
| 10,090,459 B2 | 10/2018 | Watanabe et al. | |
| 10,103,318 B2 | 10/2018 | Watanabe et al. | |
| 10,170,519 B2 | 1/2019 | Eeh et al. | |
| 10,199,568 B2 | 2/2019 | Nagamine et al. | |
| 10,211,256 B2 | 2/2019 | Kitagawa | |
| 10,263,178 B2 | 4/2019 | Sawada et al. | |
| 10,388,343 B2 | 8/2019 | Oikawa et al. | |
| 10,468,170 B2 | 11/2019 | Eeh et al. | |
| 10,510,950 B2 | 12/2019 | Watanabe et al. | |
| 10,840,434 B2 | 11/2020 | Kitagawa et al. | |
| 10,873,021 B2 * | 12/2020 | Eeh | H10N 50/85 |
| 10,950,782 B2 * | 3/2021 | Guisan | H01F 10/3259 |
| 11,088,201 B2 * | 8/2021 | Lin | H10B 61/22 |
| 11,127,445 B2 | 9/2021 | Eeh et al. | |
| 11,201,189 B2 | 12/2021 | Eeh et al. | |
| 11,217,288 B2 | 1/2022 | Sawada et al. | |
| 11,316,095 B2 | 4/2022 | Oikawa et al. | |
| 11,329,215 B2 | 5/2022 | Sawada et al. | |
| 11,335,422 B2 | 5/2022 | Aikawa et al. | |
| 11,404,098 B2 | 8/2022 | Isoda et al. | |
| 2002/0044396 A1 * | 4/2002 | Amano | B82Y 10/00 |
| | | | 365/158 |
| 2005/0068691 A1 * | 3/2005 | Kagami | B82Y 10/00 |
| 2014/0284534 A1 | 9/2014 | Nagase et al. | |
| 2014/0284733 A1 | 9/2014 | Watanabe et al. | |
| 2015/0035095 A1 * | 2/2015 | Kim | H10B 61/10 |
| | | | 257/421 |
| 2015/0068887 A1 | 3/2015 | Nagamine et al. | |
| 2015/0069544 A1 | 3/2015 | Nagamine et al. | |
| 2015/0069554 A1 | 3/2015 | Nakayama et al. | |
| 2015/0259788 A1 | 9/2015 | Nagamine et al. | |
| 2016/0099408 A1 | 4/2016 | Nagamine et al. | |
| 2016/0130693 A1 | 5/2016 | Sawada et al. | |
| 2016/0260773 A1 | 9/2016 | Kitagawa et al. | |
| 2016/0268501 A1 | 9/2016 | Kitagawa | |
| 2017/0263678 A1 | 9/2017 | Kitagawa | |
| 2017/0263679 A1 | 9/2017 | Ozeki et al. | |
| 2017/0263680 A1 * | 9/2017 | Yoshino | H10N 50/01 |
| 2018/0076262 A1 | 3/2018 | Eeh et al. | |
| 2018/0205006 A1 | 7/2018 | Watanabe et al. | |
| 2018/0269043 A1 | 9/2018 | Ueda et al. | |
| 2018/0277745 A1 | 9/2018 | Oikawa et al. | |
| 2018/0309048 A1 | 10/2018 | Ochiai et al. | |
| 2019/0296226 A1 * | 9/2019 | Eeh | H10N 50/80 |
| 2020/0075671 A1 | 3/2020 | Ozeki et al. | |
| 2020/0090719 A1 * | 3/2020 | Nishioka | H10B 61/00 |
| 2020/0294567 A1 | 9/2020 | Oikawa et al. | |
| 2020/0302985 A1 * | 9/2020 | Aikawa | G11C 11/1657 |
| 2020/0303632 A1 | 9/2020 | Watanabe et al. | |
| 2020/0343442 A1 * | 10/2020 | Honjo | H10N 50/85 |
| 2021/0074911 A1 | 3/2021 | Isoda et al. | |
| 2021/0083170 A1 * | 3/2021 | Sawada | G11C 11/1659 |
| 2021/0288240 A1 | 9/2021 | Sawada et al. | |
| 2022/0052111 A1 * | 2/2022 | Saito | H10N 50/10 |
| 2022/0085103 A1 | 3/2022 | Yoshino et al. | |
| 2022/0085279 A1 | 3/2022 | Sawada et al. | |
| 2022/0093848 A1 * | 3/2022 | Kitagawa | H10N 50/10 |
| 2022/0199136 A1 | 6/2022 | Isoda et al. | |
| 2022/0238792 A1 | 7/2022 | Sawada et al. | |

FOREIGN PATENT DOCUMENTS

| | | | | |
|---|---|---|---|---|
| JP | 2019165158 A | | 9/2019 | |
| JP | 2020035975 A | * | 3/2020 | ........... G11C 11/161 |

OTHER PUBLICATIONS

U.S. Appl. No. 17/472,472, First Named Inventor: Tadaaki Oikawa; Title: "Magnetic Memory Device"; filed Sep. 10, 2021.

U.S. Appl. No. 17/546,455, First Named Inventor: Tadaaki Oikawa; Title: "Magnetic Memory Device"; filed Dec. 9, 2021.

U.S. Appl. No. 17/549,248, First Named Inventor: Taiga Isoda; Title: "Magnetoresistance Memory Device"; filed Dec. 13, 2021.

U.S. Appl. No. 17/550,194, First Named Inventor: Taichi Igarashi; Title: "Memory Device"; filed Dec. 14, 2021.

U.S. Appl. No. 17/842,417, First Named Inventor: Tadaaki Oikawa; Title: "Magnetic Memory Device"; filed Jun. 16, 2022.

Bi, et al., "Reversible control of Co magnetism by voltage induced oxidation Physical Review Letters, 113,267202, 2014", Physical Review Letters, 113,267202, 2014.

* cited by examiner

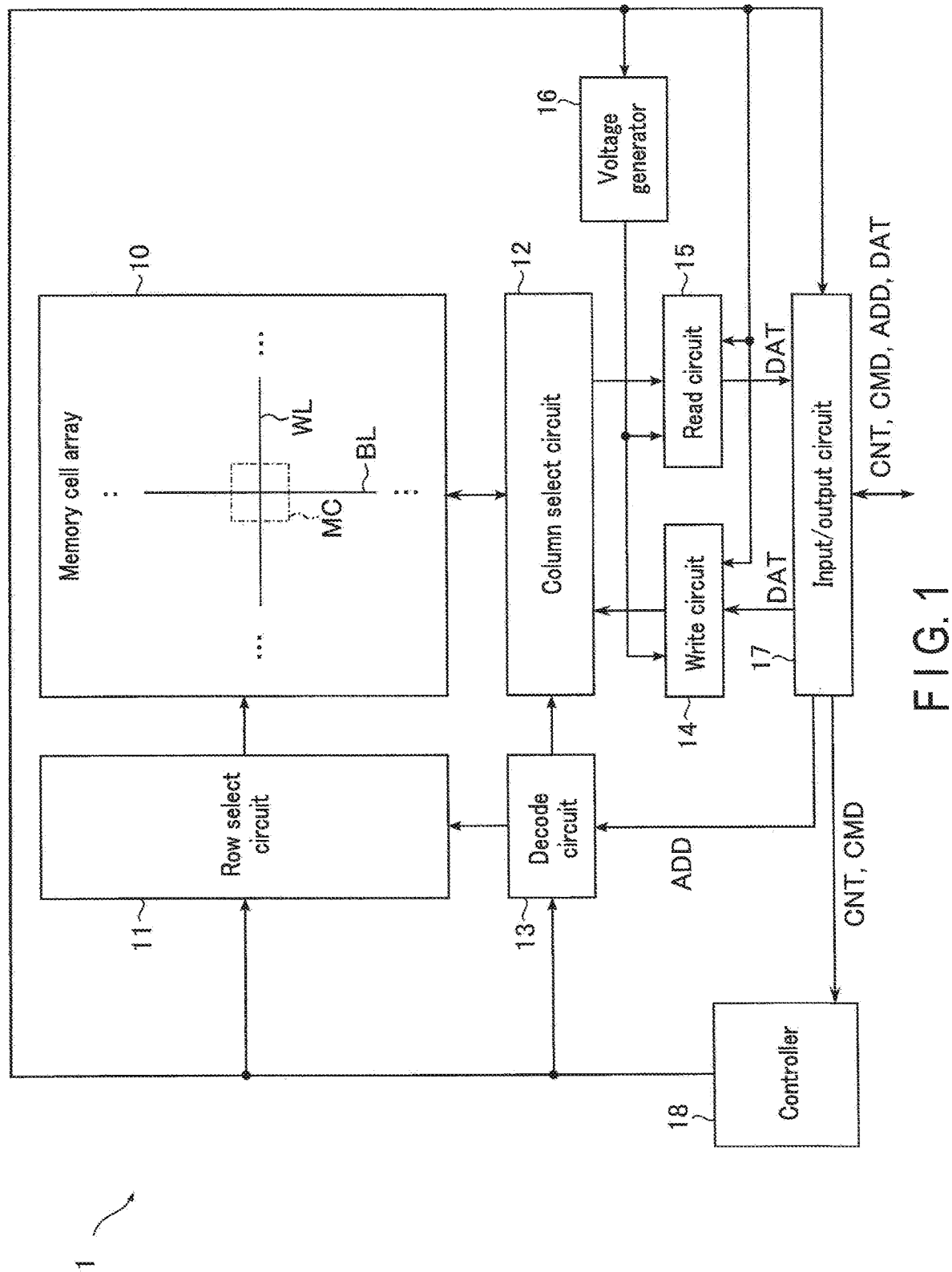
F I G. 1

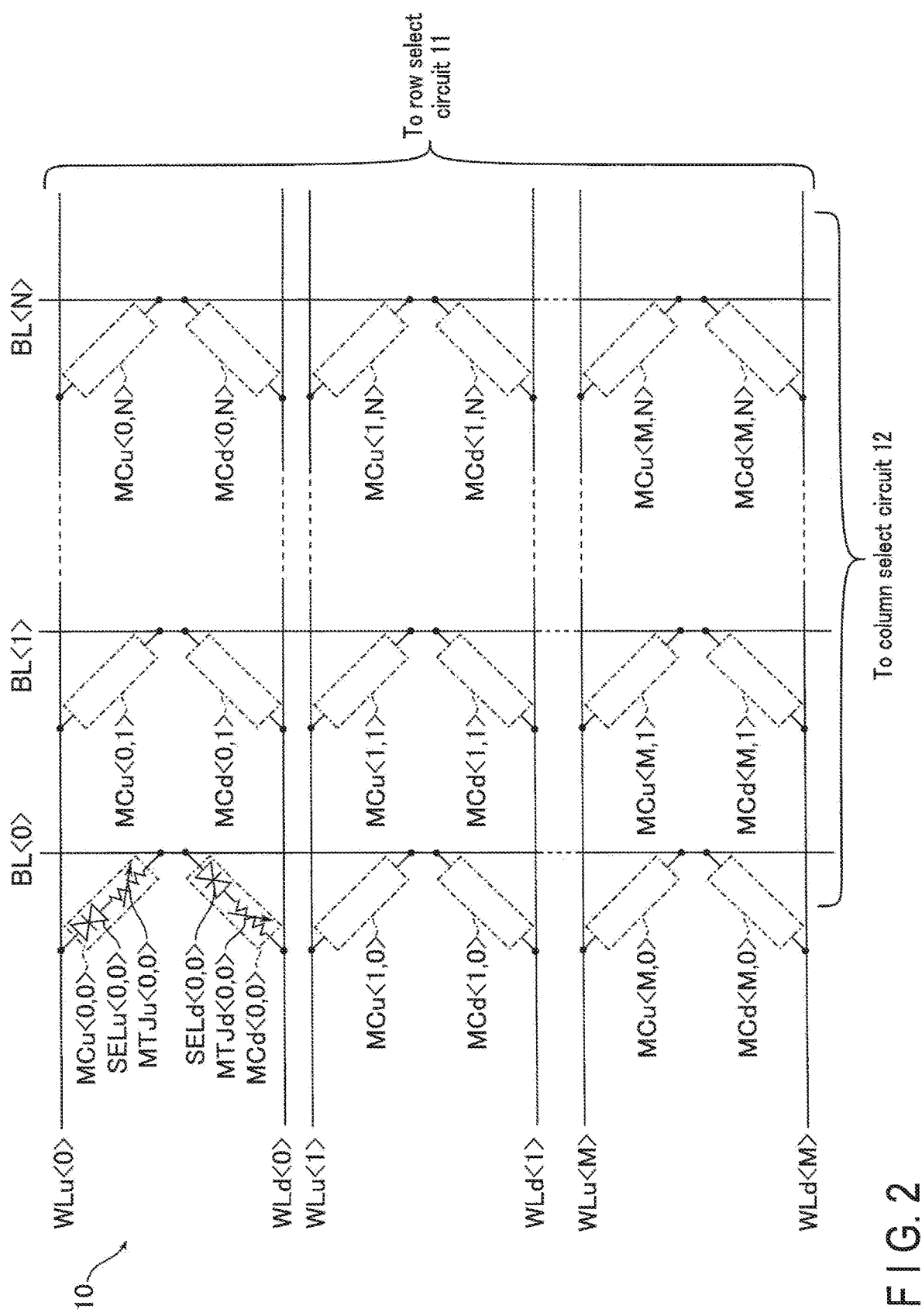
F I G. 2

MAGNETIC MEMORY DEVICE

CROSS-REFERENCE TO RELATED APPLICATIONS

This application is based upon and claims the benefit of priority from Japanese Patent Application No. 2022-046633, filed Mar. 23, 2022, the entire contents of which are incorporated herein by reference.

FIELD

Embodiments described herein relate generally to a magnetic memory device.

BACKGROUND

Magnetic memory devices (magnetoresistive random access memories or MRAM) adopting magnetoresistive effect elements as memory elements have been known.

BRIEF DESCRIPTION OF THE DRAWINGS

FIG. 1 is a block diagram showing the configuration of a magnetic memory device according to the first embodiment.

FIG. 2 is a circuit diagram showing the configuration of the memory cell array of the magnetic memory device according to the first embodiment.

DETAILED DESCRIPTION

Figure 3:
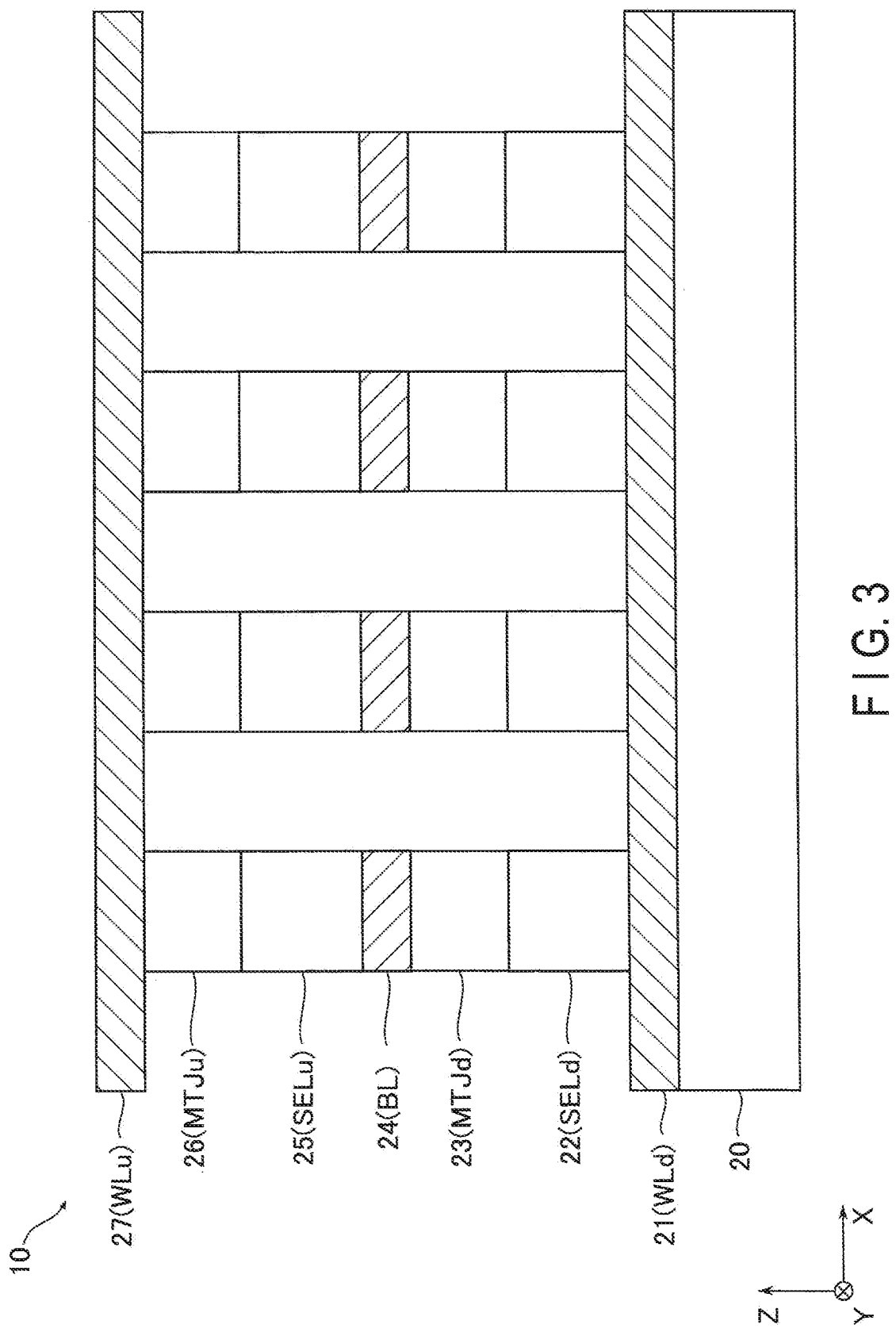
FIG. 3 is a cross section showing the configuration of the memory cell array in the magnetic memory device according to the first embodiment.

In general, according to one embodiment, a magnetic memory device includes a magnetoresistive effect element. The magnetoresistive effect element includes a first ferromagnetic layer, a second ferromagnetic layer, a layer stack, a first non-magnetic layer, a second non-magnetic layer, and a third non-magnetic layer. The layer stack is arranged on a side opposite to the first ferromagnetic layer with respect to the second ferromagnetic layer. The first non-magnetic layer is arranged between the first ferromagnetic layer and the second ferromagnetic layer. The second non-magnetic layer is arranged between the second ferromagnetic layer and the layer stack. The third non-magnetic layer is arranged on a side opposite to the second non-magnetic layer with respect to the layer stack and contains a metallic oxide. The layer stack includes a fourth non-magnetic layer being in contact with the third non-magnetic layer and containing platinum (Pt).

The embodiments will be described with reference to the drawings. In the explanation, structural components having basically the same functions and structures will be referred to by the same reference symbols. The embodiments below are to embody the technical concept. These embodiments therefore do not restrict the materials, forms, structures, arrangements or the like of the structural components, and various modifications can be made to the embodiments.

[1] Embodiment 1

A magnetic memory device according to the first embodiment will be explained. The magnetic memory device according to the first embodiment may be a magnetic memory device of a perpendicular magnetic recording system, which adopts, as variable resistance elements, elements that demonstrate magnetoresistive effects (MTJ elements) through a magnetic tunnel junction (MTJ). An MTJ element may also be referred to as a magnetoresistive effect element. This embodiment and the subsequent embodiments will be discussed as a case of MTJ elements adopted as magnetoresistive effect elements. For the sake of convenience, these elements will be described as magnetoresistive effect elements MTJ.

[1-1] Configuration

First, the configuration of the magnetic memory device according to the first embodiment will be described.

[1-1-1] Magnetic Memory Device

FIG. 1 is a block diagram showing the configuration of the magnetic memory device according to the first embodiment. A magnetic memory device 1 includes a memory cell array 10, a row select circuit 11, a column select circuit 12, a decode circuit 13, a write circuit 14, a read circuit 15, a voltage generator 16, an input/output circuit 17, and a controller 18, as illustrated in FIG. 1.

The memory cell array 10 contains a plurality of memory cells MC, each of which is associated with a pair of one row and one column. In particular, the memory cells MC of the same row are coupled to the same word line WL, and the memory cells MC of the same column are coupled to the same bit line BL.

The row select circuit 11 is coupled to the memory cell array 10 by way of word lines WL. The row select circuit 11 receives results (a row address) of decoding an address ADD from the decode circuit 13. The row select circuit 11 sets a word line WL corresponding to the row indicated by the decoding results of the address ADD to a selected state. Hereinafter, a word line WL that is set to a selected state will be referred to as a selected word line WL. Word lines WL other than the selected word line WL will be referred to as non-selected word lines WL.

The column select circuit 12 is coupled to the memory cell array 10 by way of the bit lines BL. The column select circuit 12 receives results (a column address) of decoding the address ADD from the decode circuit 13. The column select circuit 12 sets a bit line BL corresponding to the column indicated by the decoding results of the address ADD, to a selected state. Hereinafter, a bit line BL that is set to a selected state will be referred to as a selected bit line BL. Bit lines BL other than the selected bit line BL will be referred to as non-selected bit lines BL.

The decode circuit 13 decodes the address ADD received from the input/output circuit 17. The decode circuit 13 supplies the decoding results of the address ADD to the row select circuit 11 and column select circuit 12. The address ADD includes a column address and a row address that are to be selected.

The write circuit 14 writes data into memory cells MC. The write circuit 14 may include a write driver (not shown).

The read circuit 15 reads data from memory cells MC. The read circuit 15 may include a sense amplifier (not shown).

The voltage generator 16 generates voltages for various operations of the memory cell array 10 using a source voltage supplied from the outside (not shown) of the magnetic memory device 1. For instance, the voltage generator 16 generates various voltages required for a write operation and outputs them to the write circuit 14. The voltage generator 16 also generates various voltages required for a read operation and outputs them to the read circuit 15.

The input/output circuit 17 transfers the address ADD received from the outside of the magnetic memory device 1 to the decode circuit 13. The input/output circuit 17 also transfers a command CMD received from the outside of the magnetic memory device 1 to the controller 18. The input/output circuit 17 transmits and receives various control signals CNT between the outside of the magnetic memory device 1 and the controller 18. The input/output circuit 17 transfers the data DAT received from the outside of the magnetic memory device 1 to the write circuit 14, and outputs to the outside of the magnetic memory device 1 the data DAT transferred from the read circuit 15.

The controller 18 controls the operations of the row select circuit 11, column select circuit 12, decode circuit 13, write circuit 14, read circuit 15, voltage generator 16, and input/output circuit 17 in the magnetic memory device 1, in accordance with the control signals CNT and commands CMD.

[1-1-2] Memory Cell Array

Next, the structure of the memory cell array of the magnetic memory device according to the first embodiment is explained with reference to FIG. 2. In FIG. 2, a circuit diagram showing the configuration of a memory cell array of the magnetic memory device according to the first embodiment is presented. The word lines WL in FIG. 2 are distinguished with a lower-case alphabetic character ("u" or "d") and an angle-bracketed index.

As shown in FIG. 2, memory cells MC (MCu and MCd) are arranged to form a matrix in the memory cell array 10, each of which is associated with a pair of one of the bit lines BL (BL<0>, BL<1>, . . . , BL<N> and one of the word lines WLd (WLd<0>, WLd<1>, . . . , WLd<M>) and WLu (WLu<0>, WLu<1>, . . . , WLu<M>) (where M and N are any integers). That is, a memory cell MCd<i,j> (0≤i≤M, 0≤j≤N) is coupled between a word line WLd<i> and a bit line BL<j>, and a memory cell MCu<i,j> is coupled between a word line WLu<i> and a bit line BL<j>.

The alphabetic characters "u" and "d" are attached simply for the sake of convenience to indicate a memory cell MC being arranged, for example, above or beneath a bit line BL. The three-dimensional structure of the memory cell array 10 will be discussed later.

The memory cell MCd<i,j> includes a switching element SELd<i,j> and a magnetoresistive effect element MTJd<i,j> that are coupled in series with each other. The memory cell MCu<i,j> includes a switching element SELu<i,j> and a magnetoresistive effect element MTJu<i,j> that are coupled in series with each other.

The switching element SEL serves as a switch for controlling the current supply to the magnetoresistive effect element MTJ at the time of writing data to and reading data from the corresponding magnetoresistive effect element MTJ. In particular, when the voltage applied to a memory cell MC is lower than the threshold voltage Vth, the switching element SEL of the memory cell MC serves as a highly resistive insulator interrupting the current (falling into an OFF state), while when the voltage exceeds the threshold voltage Vth, it serves as a low resistive conductor passing the current (falling into an ON state). That is, the switching element SEL is provided with a function of switching between interruption and passage of the current in accordance with the voltage applied to the memory cell MC, regardless of the direction of the current flow.

The switching element SEL may be a two-terminal switching element. When the voltage applied between the two terminals is lower than the threshold voltage, this switching element is in a "high resistance" state, being electrically non-conductive, for example. When the voltage applied between the two terminals is higher than or equal to the threshold voltage, the switching element is in a "low resistance" state, being electrically conductive, for example. The switching element may have this function, regardless of the polarity of the voltage.

With the current supply controlled by the switching element SEL, the resistance value of a magnetoresistive effect element MTJ can be switched between the low resistance state and high resistance state. The magnetoresistive effect element MTJ functions as a memory element designed to write data, hold the written data in a non-volatile manner, and read the data, in accordance with the changes of the resistance state of the element.

Next, the cross-sectional structure of the memory cell array 10 will be explained with reference to FIGS. 3 and 4. Exemplary cross sections of a memory cell array in the magnetic memory device according to the first embodiment, as viewed from different directions that are intersecting each other, are presented in FIGS. 3 and 4.

Figure 4:
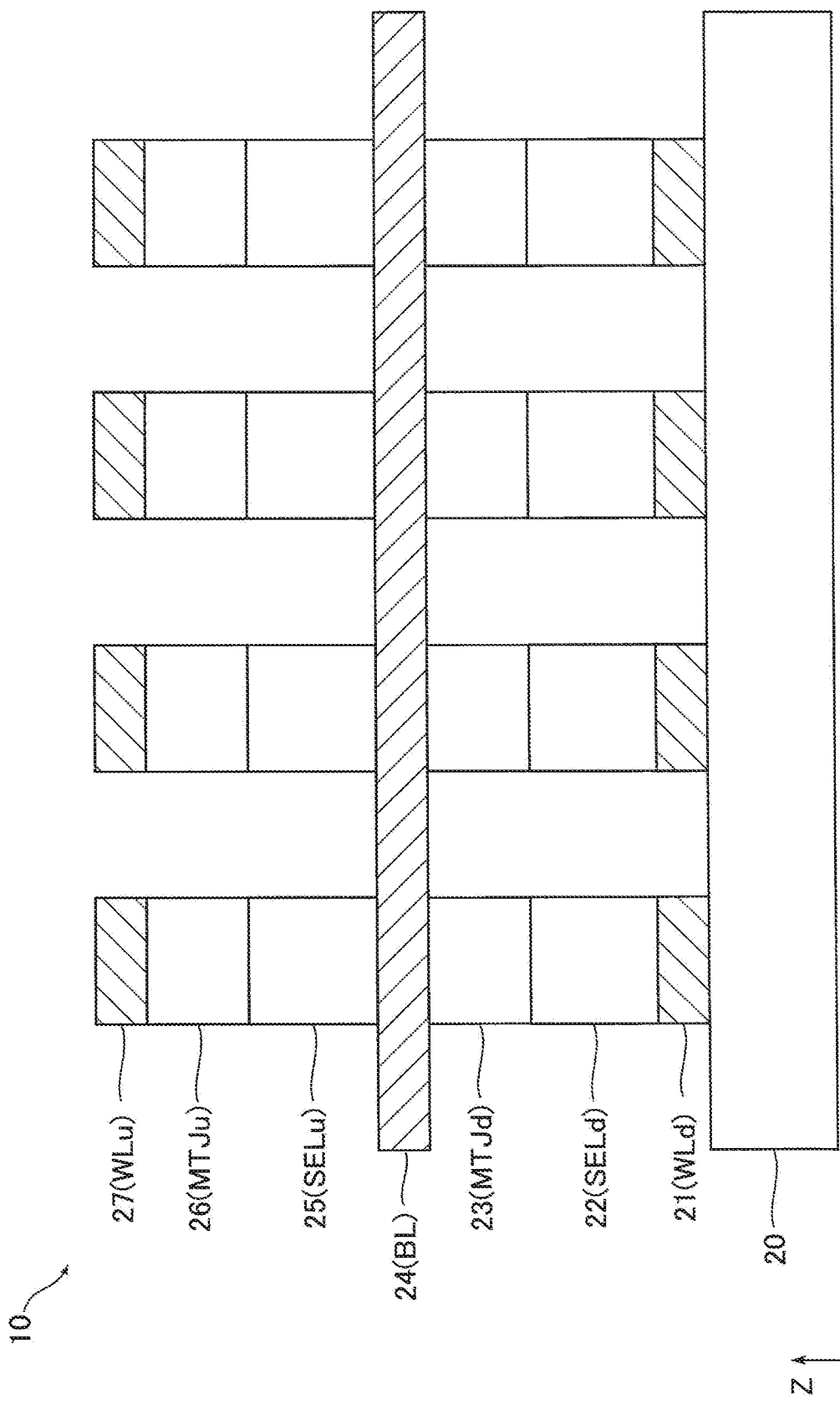
FIG. 4 is a cross section showing the configuration of the memory cell array in the magnetic memory device according to the first embodiment.

As illustrated in FIGS. 3 and 4, the memory cell array 10 is arranged on a semiconductor substrate 20. In the following description, a plane parallel to the surface of the semiconductor substrate 20 will be referred to as an XY plane, and the axis perpendicular to the XY plane will be referred to as a Z-axis. On the XY plane, the axis extending along the word lines WL will be referred to as an X-axis, and the axis extending along the bit lines BL will be referred to as a Y-axis. FIG. 3 presents a cross section of the memory cell array 10 viewed along the Y-axis, and FIG. 4 presents a cross section of the memory cell array 10 viewed along the X-axis.

A plurality of conductors 21 are arranged on the top surface of the semiconductor substrate 20. The conductors 21 are conductive and function as word lines WLd. The conductors 21 may be aligned along the Y-axis, each extending along the X-axis. FIGS. 3 and 4 show multiple conductors 21 arranged on the semiconductor substrate 20, which is not a limitation. The conductors 21 may be arranged above the semiconductor substrate 20 without being in contact with the semiconductor substrate 20.

A plurality of elements 22, each of which functions as a switching element SELd, are arranged on the top surface of a conductor 21. The elements 22 on the conductor 21 may be aligned along the X-axis. In other words, the elements 22 aligned along the X-axis on the top surface of one conductor 21 are commonly coupled thereto.

Elements 23 are arranged on the top surface of each of the elements 22 to serve as magnetoresistive effect elements MTJd. The configuration of an element 23 will be discussed later in detail. The top surface of the element 23 is coupled to one of the conductors 24. The conductors 24 are conductive and function as bit lines BL. The conductors 24 are aligned with each other along the X-axis, each extending along the Y-axis. That is, the elements 23 aligned along the Y-axis are commonly coupled to one conductor 24. FIGS. 3 and 4 show multiple elements 23 arranged in contact with the top surface of the corresponding elements 22 and with the bottom surface of the corresponding conductors 24, which is not a limitation. Each element 23 may be coupled to the element 22 and conductor 24 with a conductive contact plug (not shown) interposed between.

Elements 25 are arranged on the top surface of each conductor 24 to serve as switching elements SELu. The elements 25 on the top surface of the conductor 24 may be aligned with each other along the X-axis. The elements 25 aligned along the Y-axis are commonly coupled to the top surface of one conductor 24.

Elements 26 are arranged on the top surface of each of the elements 25 to serve as magnetoresistive effect elements MTJu. An element 26 may have a structure similar to that of the element 23. The top surface of the element 26 is coupled to one of the conductors 27. The conductors 27 are conductive and function as word lines WLu. The conductors 27 may be aligned along the Y-axis, each extending along the X-axis. That is, the elements 26 aligned along the X-axis are commonly coupled to one conductor 27. FIGS. 3 and 4 show multiple elements 26 arranged in contact with the top surface of the corresponding elements 25 and with the bottom surface of the corresponding conductors 27, which is not a limitation. Each element 26 may be coupled to the element 25 and conductor 27 with a conductive contact plug (not shown) interposed between.

With the above arrangement, a pair of word lines WLd and WLu corresponds to one bit line BL in the memory cell array 10. Furthermore, in the memory cell array 10, a memory cell MCd is arranged between a word line WLd and a bit line BL, and a memory cell MCu is arranged between a bit line BL and a word line WLu. This means that the memory cell array 10 has a structure in which memory cells MC are arranged at different height levels along the Z-axis. In the cell structure of FIGS. 3 and 4, the memory cells MCd correspond to the lower layer, while the memory cells MCu correspond to the upper layer. Of the two memory cells MC commonly coupled to one bit line BL, the memory cell MC in the upper layer with respect to the bit line BL corresponds to a memory cell MCu with the alphabetic character "u" attached, while the memory cell MC in the lower layer corresponds to a memory cell MCd with "d" attached.

[1-1-3] Magnetoresistive Effect Element

Figure 5:
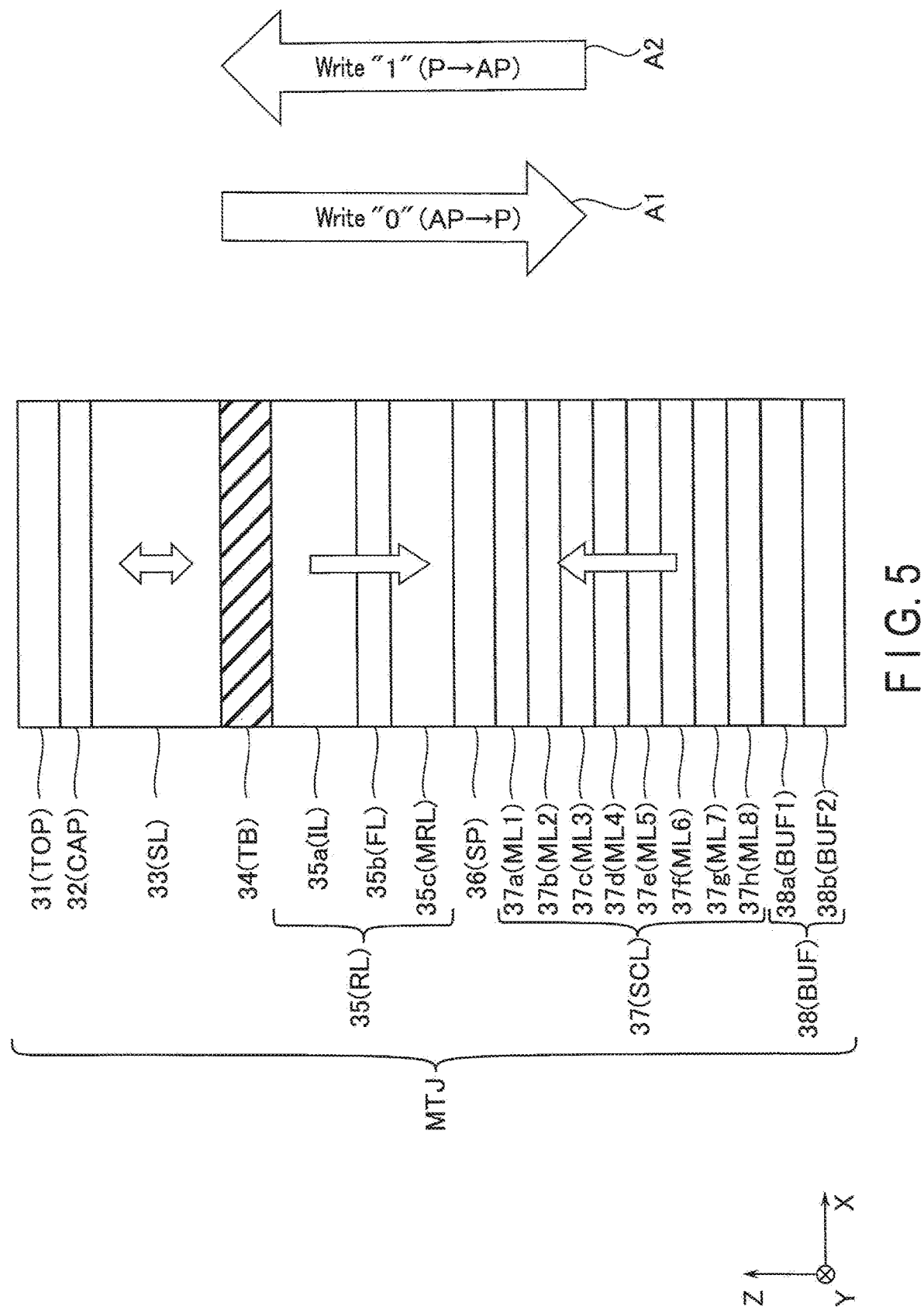
FIG. 5 is a cross section showing the configuration of a magnetoresistive effect element in the magnetic memory device according to the first embodiment.

Next, the configuration of the magnetoresistive effect element in the magnetic memory device according to the first embodiment will be explained with reference to FIG. 5. In FIG. 5, a cross section showing the configuration of a magnetoresistive effect element in the magnetic memory device according to the first embodiment is presented. FIG. 5 presents an exemplary cross section of the magnetoresistive effect element MTJd in FIGS. 3 and 4, taken along a plane perpendicular to the Z-axis (e.g., XZ plane). A magnetoresistive effect element MTJu has a configuration similar to that of the magnetoresistive effect element MTJd, and therefore its illustration is omitted.

As illustrated in FIG. 5, the magnetoresistive effect element MTJ may include a non-magnetic layer 31 that serves as a top layer TOP, a non-magnetic layer 32 that serves as a capping layer CAP, a ferromagnetic layer 33 that serves as a storage layer SL, a non-magnetic layer 34 that serves as a tunnel barrier layer TB, a layer stack 35 that serves as a reference layer RL, a non-magnetic layer 36 that serves as a spacer layer SP, a layer stack 37 that serves as a shift cancel layer SCL, and a layer stack 38 that serves as a buffer layer BUF. The storage layer SL may include a plurality of layers and may be regarded as forming a single ferromagnetic structure. The same applies to the layers in the reference layer RL and the layers in the shift cancel layer SCL. The layers in the buffer layer BUF may be regarded to form a single non-magnetic structure.

For instance, the magnetoresistive effect element MTJd may include multiple films stacked in the order of the layer stack 38, layer stack 37, non-magnetic layer 36, layer stack 35, non-magnetic layer 34, ferromagnetic layer 33, non-magnetic layer 32, and non-magnetic layer 31 from the word line WLd side to the bit line BL side (in the Z-axis direction). The magnetoresistive effect element MTJu may include multiple films stacked in the order of the layer stack 38, layer stack 37, non-magnetic layer 36, layer stack 35, non-magnetic layer 34, ferromagnetic layer 33, non-magnetic layer 32, and non-magnetic layer 31 from the bit line BL side to the word line WLu side (in the Z-axis direction). The magnetoresistive effect elements MTJd and MTJu may function as MTJ elements of a perpendicular magnetic type, in which the magnetization direction of a magnetic substance that respectively constitutes the magnetoresistive effect elements MTJd and MTJu is perpendicular to the film surface. The magnetoresistive effect elements MTJ may further include, between any adjacent two of the layers 31 to 38, any layer that is not shown.

According to the first embodiment, a spin injection write system may be adopted, in which a write current is supplied directly into a magnetoresistive effect element MTJ to inject a spin torque into the storage layer SL and reference layer RL, thereby controlling the magnetization direction of the storage layer SL and the magnetization direction of the reference layer RL. The magnetoresistive effect element MTJ may be either in the low resistance state or in the high resistance state, depending on the magnetization directions of the storage layer SL and reference layer RL that are parallel or anti-parallel to each other.

When a current IwAPP having a specific amount is supplied to the magnetoresistive effect element MTJ in the direction of arrow A1, that is, in the direction from the storage layer SL toward the reference layer RL in FIG. 5, a parallel relationship is established between the magnetization directions of the storage layer SL and reference layer RL. In the parallel state, the resistance of the magnetoresistive effect element MTJ takes the minimal value, setting the magnetoresistive effect element MTJ to the low resistance state. The low resistance state is referred to as "parallel (P) state", defining for example a data "0" state.

On the other hand, when a write current IwPAP larger than the write current IwAPP is supplied to the magnetoresistive effect element MTJ in the direction of arrow A2, that is, in the direction from the reference layer RL toward the storage layer SL (i.e., direction opposite to arrow A1) in FIG. 5, an anti-parallel relationship is established between the magnetization directions of the storage layer SL and reference layer RL. In the anti-parallel state, the resistance of the magnetoresistive effect element MTJ takes the maximum value, which sets the magnetoresistive effect element MTJ to the high resistance state. This high resistance state is referred to as an "anti-parallel (AP) state", defining for example a data "1" state.

Next, the layers of a magnetoresistive effect element MTJ will be explained in detail.

The non-magnetic layer 31 is a non-magnetic conductor, and serves as a top electrode that enhances the electric connectivity between the upper end of the magnetoresistive effect element MTJ and a bit line BL or word line WL. The non-magnetic layer 31 may contain at least one element or compound selected from tungsten (W), tantalum (Ta), molybdenum (Mo), hafnium (Hf), ruthenium (Ru), tantalum nitride (TaN), titanium (Ti) and titanium nitride (TiN). Alternatively, the non-magnetic layer 31 may contain a layer stack containing at least one element or compound selected from these materials.

The non-magnetic layer 32 is a non-magnetic layer having a function of suppressing an increase in the damping constant of the ferromagnetic layer 33 and reducing the write current. The non-magnetic layer 32 may contain, for example, an alkaline-earth element or rare-earth element and oxygen, or substantially an alkaline-earth metal oxide or rare-earth element oxide. For instance, the non-magnetic layer 32 may contain oxygen and magnesium, or substantially magnesium oxide (MgO). Similarly, the non-magnetic layer 32 may contain oxygen and aluminum, or substantially aluminum oxide ($Al_2O_3$). The non-magnetic layer 32 may be a mixture of any of these oxides. That is, the non-magnetic layer 32 is not limited to a binary compound containing two kinds of elements, and may be a ternary compound containing three kinds of elements such as magnesium aluminum oxide (MgAlO).

The ferromagnetic layer 33 exhibits ferromagnetism, having an easy magnetization axis in a direction perpendicular to the film surface. The ferromagnetic layer 33 has a magnetization direction along the Z-axis, toward either one of the bit line BL side and word line WL side. The ferromagnetic layer 33 may contain at least one of iron (Fe), cobalt (Co), and nickel (Ni). Furthermore, the ferromagnetic layer 33 may further contain boron (B). In particular, the ferromagnetic layer 33 may include iron cobalt boron (FeCoB) or iron boride (FeB), having a body-centered cubic crystal structure.

The non-magnetic layer 34 is a non-magnetic insulator, containing, for example, oxygen and magnesium, or substantially magnesium oxide (MgO). The non-magnetic layer 34 has a NaCl crystal structure in which the film surface is oriented in the (001) plane, and serves as a seed or a core for growing a crystalline film from the interface with respect to the ferromagnetic layer 33 in the crystallizing process of the ferromagnetic layer 33. The non-magnetic layer 34, which is arranged between the ferromagnetic layer 33 and layer stack 35, forms a magnetic tunnel junction together with these two ferromagnetic layers.

The layer stack 35 can be regarded as a single ferromagnetic layer, having an easy magnetization axis extending in the direction perpendicular to the film surface. The layer stack 35 has a magnetization direction along the Z-axis, directed either to the bit line BL side or to the word line WL side. The layer stack 35 has a fixed magnetization direction. In the example of FIG. 5, the magnetization direction is directed toward the layer stack 37. The "fixed magnetization direction" represents the magnetization direction being unchangeable by a current (spin torque) large enough to reverse the magnetization direction of the ferromagnetic layer 33.

In particular, the layer stack 35 includes a ferromagnetic layer 35a serving as an interface layer IL, a non-magnetic layer 35b serving as a function layer FL, and a ferromagnetic layer 35c serving as a main reference layer MRL. For instance, the ferromagnetic layer 35c, non-magnetic layer 35b, and ferromagnetic layer 35a are stacked in this order between the upper surface of the non-magnetic layer 36 and the bottom surface of the non-magnetic layer 34.

The ferromagnetic layer 35a is a ferromagnetic conductor, and may contain at least one of iron (Fe), cobalt (Co) and nickel (Ni). The ferromagnetic layer 35a may further contain boron (B). In particular, the ferromagnetic layer 35a may contain iron cobalt boron (FeCoB) or iron boride (FeB), having a body-centered cubic crystal structure.

The non-magnetic layer 35b is a non-magnetic conductor, and may contain at least one metal selected from tantalum (Ta), hafnium (Hf), tungsten (W), zirconium (Zr), molybdenum (Mo), niobium (Nb) and titanium (Ti). The non-magnetic layer 35b has a function of maintaining exchange coupling between the ferromagnetic layer 35a and ferromagnetic layer 35c.

The ferromagnetic layer 35c may include at least one multi-layer film selected from a multi-layer film containing cobalt (Co) and platinum (Pt) (Co/Pt multi-layer film), a multi-layer film containing cobalt (Co) and nickel (Ni) (Co/Ni multi-layer film), and a multi-layer film containing cobalt (Co) and palladium (Pd) (Co/Pd multi-layer film). Alternatively, the ferromagnetic layer 35c may be a CoPt, CoPd, or CoNi alloy film containing at least Co, or a Co monolayer film. Of the multi-layer films and monolayer film that constitute the ferromagnetic layer 35c, the layer adjacent to the non-magnetic layer 36 contains, for example, cobalt (Co).

The non-magnetic layer 36 is a non-magnetic conductor, containing at least one element selected from ruthenium (Ru), osmium (Os), rhodium (Rh), iridium (Ir), vanadium (V), and chromium (Cr). The non-magnetic layer 36 has a function of coupling the magnetization of the layer stack 35 and the magnetization of the layer stack 37 in an anti-parallel manner.

The layer stack 37 can be regarded as a single ferromagnetic layer, having an easy magnetization axis extending in the direction perpendicular to the film surface. The layer stack 37 has a magnetization direction along the Z-axis, directed either to the bit line BL side or to the word line WL side. In a similar manner to the layer stack 35, the layer stack 37 has a fixed magnetization direction. In the example of FIG. 5, this magnetization direction is illustrated as being toward the layer stack 35.

In particular, the layer stack 37 contains a ferromagnetic layer 37a (ML1), a non-magnetic layer 37b (ML2), a ferromagnetic layer 37c (ML3), a non-magnetic layer 37d (ML4), a ferromagnetic layer 37e (ML5), a non-magnetic layer 37f (ML6), a ferromagnetic layer 37g (ML7), and a non-magnetic layer 37h (ML8), each of which serves as one of the multi-layers ML. For instance, the non-magnetic layer 37h, ferromagnetic layer 37g, non-magnetic layer 37f, ferromagnetic layer 37e, non-magnetic layer 37d, ferromagnetic layer 37c, non-magnetic layer 37b, and ferromagnetic layer 37a are stacked in this order between the top surface of the layer stack 38 and the bottom surface of the non-magnetic layer 36.

The ferromagnetic layer 37a is a ferromagnetic conductor having a hexagonal close-packed (hcp) crystal structure or a face-centered cubic (fcc) crystal structure, which may contain cobalt (Co). The ferromagnetic layers 35c and 37a are antiferromagnetically coupled to each other by the non-magnetic layer 36. That is, the ferromagnetic layer 35c (more specifically, the layer adjacent to the non-magnetic layer 36 among the multi-layers that constitute the ferromagnetic layer 35c) and the ferromagnetic layer 37a are coupled in such a manner as to have magnetization directions that are anti-parallel to each other. In the example of FIG. 5, the magnetization directions of the ferromagnetic layers 35c and 37a face each other. Such a structure of the ferromagnetic layer 35c, non-magnetic layer 36, and ferromagnetic layer 37a coupled together is referred to as a synthetic anti-ferromagnetic (SAF) structure.

The non-magnetic layer 37b is a non-magnetic conductor containing platinum (Pt). The ferromagnetic layer 37c is a ferromagnetic conductor containing cobalt (Co). The non-magnetic layer 37d is a non-magnetic conductor containing platinum (Pt). The ferromagnetic layer 37e is a ferromagnetic conductor containing cobalt (Co). The non-magnetic layer 37f is a non-magnetic conductor containing platinum (Pt). The ferromagnetic layer 37g is a ferromagnetic conductor containing cobalt (Co). The non-magnetic layer 37h is a non-magnetic conductor containing platinum (Pt). The non-magnetic layer 37h has a crystalline structure of a face-centered cubic system in which the film surface is oriented on the (111) plane.

The example of FIG. 5 shows four pairs of ferromagnetic layers and non-magnetic layers stacked in the layer stack 37. The layer stack 37 may have five or more pairs of ferromagnetic layers and non-magnetic layers, or may have two or three pairs. Each of the pairs of ferromagnetic layers and non-magnetic layers forms a multi-layered film of cobalt (Co) and platinum (Pt).

With the above structure, the layer stack 37 can cancel out the influence of the stray field of the layer stack 35 onto the ferromagnetic layer 33 in the magnetization direction. The stray field of the layer stack 35 and the like tends to cause asymmetry in the magnetic reversal of the ferromagnetic layer 33 (or in other words, a discrepancy tends to appear between the tendency of the magnetic reversal of the ferromagnetic layer 33 in one direction and the tendency of the magnetic reversal in the opposite direction). The layer stack 37, however, can suppress such an asymmetric tendency.

The layer stack 38 can be regarded as a single non-magnetic layer, and functions as an electrode that enhances the electric connectivity with the bit lines BL and word lines WL. Specifically, the layer stack 38 contains a non-magnetic layer 38a (BUF1) and a non-magnetic layer 38b (BUF2), each of which functions as a buffer layer BUF. For instance, the non-magnetic layer 38b and non-magnetic layer 38a are stacked in this order along the Z-axis between the semiconductor substrate 20 and the bottom surface of the layer stack 37.

The non-magnetic layer 38a is a metal-oxide film. The non-magnetic layer 38a is a non-magnetic conductor containing a metallic oxide that has an electronegativity of 1.8 or lower, such as gadolinium oxide ($GdO_x$) or aluminum oxide ($AlO_x$). The non-magnetic layer 38a has a thickness of 1.0 nanometer, for example. The non-magnetic layer 38a has an amorphous structure, and exhibits a relatively small bonding energy with a precious metal such as platinum (Pt). The non-magnetic layer 38a has a function of promoting the crystallization of the non-magnetic layer 37h during the deposition of the non-magnetic layer 37h.

The non-magnetic layer 38b is a non-magnetic conductor containing at least one compound selected from titanium nitride (TiN), hafnium nitride (HfN), zirconium nitride (ZrN), tantalum nitride (TaN), and tungsten nitride (WN).

[1-2] Advantageous Effects

According to the first embodiment, the magnetoresistive effect element can be provided with an improved immunity to an external magnetic field.

In the reference layer of the magnetoresistive effect element MTJ, its magnetization needs to be prevented from being reversed at the time of writing, reading and storing. In order to suppress an erroneous reversal of the reference layer at writing, reading and storing, the shift cancel layer which magnetically coupled to the reference layer in an anti-parallel direction needs to be provided with an enough high anisotropic magnetic field.

Figure 6:
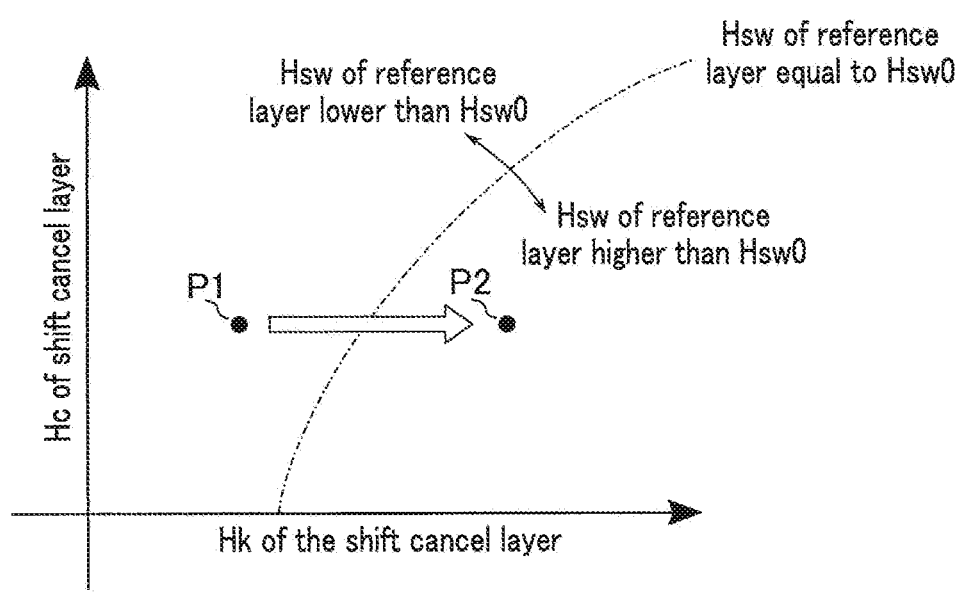
FIG. 6 is a diagram explaining the relationship between the film characteristics of a shift cancel layer before the element is processed and the element characteristics after the element is processed according to the first embodiment.

FIG. 6 is a diagram explaining the relationship between the film characteristics of a shift cancel layer before patterning and the element characteristics after patterning according to the first embodiment. The horizontal axis of the diagram indicates the anisotropic magnetic field (Hk) of the film of the shift cancel layer, and the vertical axis indicates the magnetic coercive force (Hc) of the film of the shift cancel layer. The dot-dashed curve shows where the spin-flip field (Hsw) of the element, in which the magnetizations of the reference layer and shift cancel layer are reversed while maintaining an anti-parallel relationship, becomes equal to a value Hsw0. For instance, the value Hsw0 can be defined as, when the spin-flip fields (Hsw) of multiple elements exhibit a normal distribution, the Hsw of elements that exist at the probability of $-3\sigma$. That is, on the right side of the dot-dashed curve, the spin-flip field (Hsw) for the elements at $-3\sigma$ is greater than the value Hsw0, while on the left side of the curve, the spin-flip field (Hsw) for the elements at $-3\sigma$ is lower than the value Hsw0. FIG. 6 shows two plots P1 and P2. The plot P1 represents a comparative example in which the buffer layers contain no metallic oxide. At the plot P1, the spin-flip field (Hsw) of the element is lower than value Hsw0. The plot P2 represents the first embodiment. In comparison with the plot P1, the plot P2 exhibits a stronger anisotropic magnetic field (Hk) of the shift cancel layer, and the spin-flip field (Hsw) of the element is higher than the value Hsw0. According to the first embodiment, the shift cancel layer configured to have, as film characteristics prior to the element processing, an enhanced anisotropic magnetic field (Hk) with maintained magnetic coercive force (Hc), can enhance the spin-flip field (Hsw) for the elements at the probability of $-3\sigma$.

The anisotropic magnetic field of the shift cancel layer increases as the crystallinity of the shift cancel layer increases. According to the first embodiment, a metallic oxide having an amorphous structure and demonstrating an electronegativity of 1.8 or lower is adopted for the non-magnetic layer 38a in the buffer layer adjacent to the shift cancel layer. Furthermore, the non-magnetic layer 37h of the adjacent shift cancel layer contains platinum (Pt). The metallic oxide in the amorphous structure is bonded to platinum (Pt) with a small bonding energy, and the platinum (Pt) is oriented preferentially on the (111) plane. This accelerates the crystallization of the platinum (Pt) in the non-magnetic layer 37h, which is adjacent to the non-magnetic layer 38a with the amorphous structure. As a result, according to the first embodiment, a shift cancel layer with a high crystallinity, or in other words with a strong anisotropic magnetic field, can be provided.

In light of the above, according to the first embodiment, a shift cancel layer with a strong anisotropic magnetic field can be provided, and the reversal magnetic field of the reference layer can be strengthened, which realizes a magnetoresistive effect element MTJ with an improved immunity to an external magnetic field.

To provide a shift cancel layer with a high crystallinity, it may be possible to include a layer of platinum (Pt), ruthenium (Ru), iridium (Ir) or the like having a thickness of approximately 2.0 nanometers in the buffer layer. The first embodiment, however, provides a non-magnetic layer 38a of 1.0 nanometer thick, which results in a buffer layer thinner than the structure including a 2.0-nanometer thick layer of platinum (Pt), ruthenium (Ru), iridium (Ir) or the like. Thus, a high density integration can be achieved in the magnetoresistive effect element MTJ of the magnetic memory device according to the first embodiment.

[2] Embodiment 2

A magnetic memory device according to the second embodiment differs from the magnetic memory device according to the first embodiment in the structure of the layer stack 38 in the magnetoresistive effect element MTJ. The magnetoresistive effect element according to the second embodiment will be discussed below, focusing on differences with respect to the first embodiment.

[2-1] Configuration

[2-1-1] Magnetoresistive Effect Element

Figure 7:
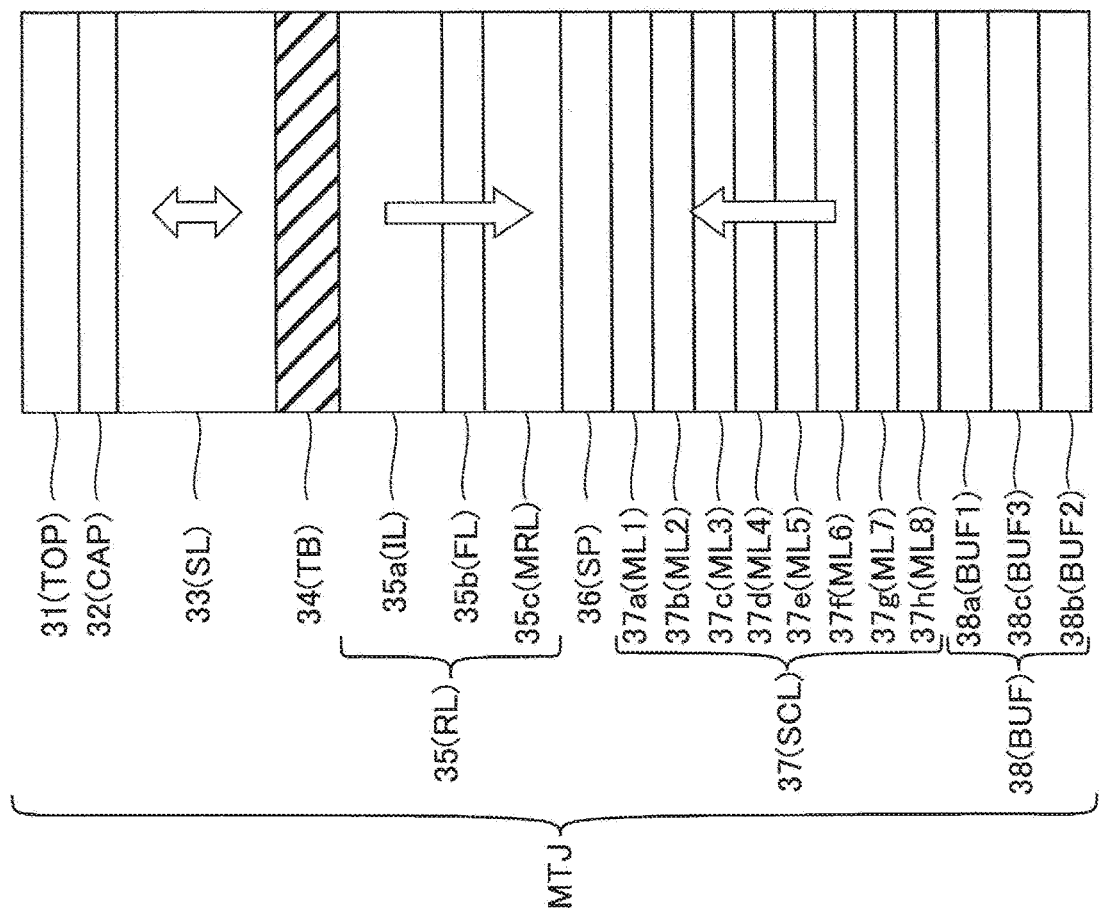
FIG. 7 is a cross section showing the configuration of a magnetoresistive effect element in a magnetic memory device according to the second embodiment.

FIG. 7 is a cross section showing the configuration of a magnetoresistive effect element in the magnetic memory device according to the second embodiment. The magnetoresistive effect element according to the second embodiment differs from the magnetoresistive effect element according to the first embodiment in that the layer stack 38 further includes a non-magnetic layer 38c.

The layer stack 38 can be regarded as a single non-magnetic layer, and functions as an electrode that enhances the electric connectivity with the bit lines BL and word lines WL. Specifically, the layer stack 38 contains a non-magnetic layer 38a (BUF1), a non-magnetic layer 38c (BUF3), and a non-magnetic layer 38b (BUF2), each of which functions as a buffer layer BUF. For instance, the non-magnetic layer 38b, non-magnetic layer 38c, and non-magnetic layer 38a are stacked in this order along the Z-axis between the semiconductor substrate 20 and the bottom surface of the layer stack 37.

The non-magnetic layer 38c is a non-magnetic conductor, containing at least one element selected from titanium (Ti), zirconium (Zr), hafnium (Hf), vanadium (V), niobium (Nb), tantalum (Ta), chromium (Cr), molybdenum (Mo), tungsten (W), carbon (C), silicon (Si), and germanium (Ge). The non-magnetic layer 38b has a function of lowering the resistance of the layer stack 38.

The rest of the configuration of the magnetoresistive effect element according to the second embodiment is the same as that of the first embodiment.

[2-2] Advantageous Effects

According to the second embodiment, the magnetoresistive effect element is provided with an improved immunity to the external magnetic field in a manner similar to the first embodiment. Furthermore, according to the second embodiment, a reduction in MR ratio can be suppressed.

According to the second embodiment, a non-magnetic layer 38c is provided beneath the non-magnetic layer 38a having an amorphous structure. With the non-magnetic layer 38c, the resistance of the layer stack 38 can be lowered. This can suppress a reduction in the ratio of the resistances of the magnetoresistive effect element MTJ in a high resistance state and low resistance state, or in other words an MR ratio.

[3] Others

In the memory cells MC described in the above embodiments, magnetoresistive effect elements MTJ are arranged above the switching elements SEL. The magnetoresistive effect elements MTJ, however, may be arranged below the switching elements SEL.

Figure 8:
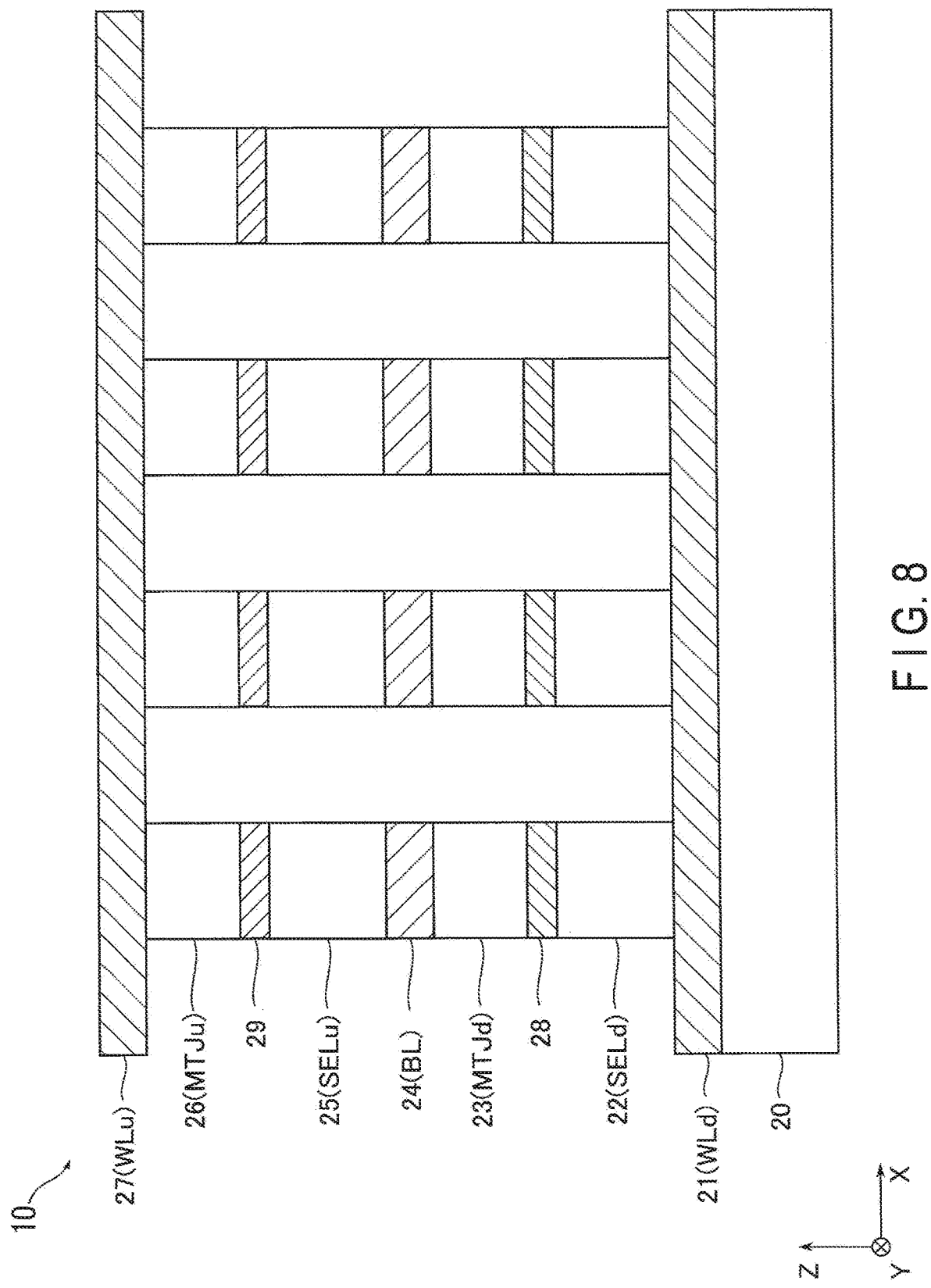
FIG. 8 is a cross section showing the configuration of a memory cell array in a magnetic memory device according to a modification example.
Figure 9:
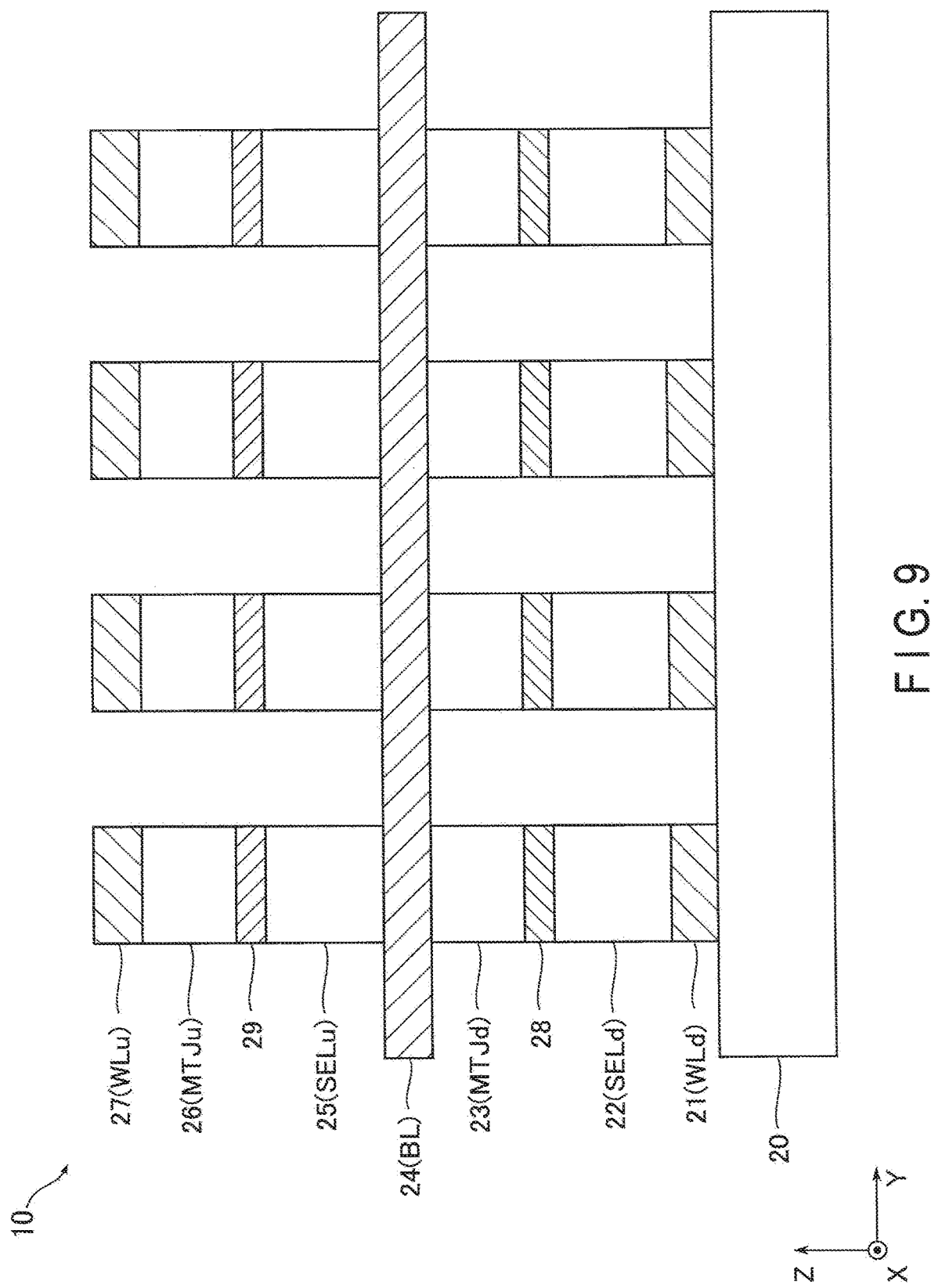
FIG. 9 is a cross section showing the configuration of the memory cell array in the magnetic memory device according to the modification example.

According to the above embodiments, the magnetoresistive effect elements MTJ are arranged on the top surface of the switching elements SEL. The structure, however, may be such that a conductor is interposed between the switching elements SEL and magnetoresistive effect elements MTJ. FIGS. 8 and 9 present exemplary cross sections of a memory cell array in the magnetic memory device according to a modification example. The cross section of FIG. 8 corresponds to that of FIG. 3, and the cross section of FIG. 9 corresponds to that of FIG. 4. A conductor 28 is provided on the top surface of each of the elements 22. The conductors 28 are conductive, and an element 23 is provided on the top surface of each of the conductors 28. A conductor 29 is provided on the top surface of each of the elements 25. The conductors 29 are conductive, and an element 26 is provided on the top surface of each of the conductors 29. The rest of the configuration of the magnetic memory device according to the modification example is the same as that of the magnetic memory device according to the first embodiment. The modification example can improve the tolerance to the external magnetic field in the magnetoresistive effect element in the same manner as in the first and second embodiments.

According to the above embodiments, the layer stack 38 includes the non-magnetic layer 38b. The non-magnetic layer 38b, however, may be omitted. For instance, if the non-magnetic layer 38b is omitted from the structure of the first embodiment, the non-magnetic layer 38a will be positioned at the bottom end of the magnetoresistive effect element MTJ. If the non-magnetic layer 38b is omitted from the structure of the second embodiment, the non-magnetic layer 38c will be positioned at the bottom end of the magnetoresistive effect element MTJ. In the above embodiments, the bottom end of the magnetoresistive effect element MTJ is coupled to the switching element SEL. If the magnetoresistive effect element MTJ is arranged below the switching element SEL, the bottom end of the magnetoresistive effect element MTJ will be coupled to the word line WL or bit line BL. If the magnetoresistive effect element MTJ is arranged above the switching element SEL and a conductor is arranged between the switching element SEL and magnetoresistive effect element MTJ, the bottom end of the magnetoresistive effect element MTJ will be coupled to the conductor.

Throughout the specification, the expression "coupling" refers to electrical coupling, which may include coupling by way of other elements. The expression "electrically coupled" may indicate components being connected with an insulator interposed between as long as the components are capable of operating in the same manner as when electrically connected.

The embodiments of the present invention have been explained. These are presented merely as examples and are not intended to restrict the scope of the invention. These novel embodiments may be realized in various other forms, and various omissions, replacements, and changes can be made without departing from the gist of the invention. Such embodiments and modifications are included in the scope and gist of the invention, and are included in the scope of the invention described in the claims and its equivalents.

The invention claimed is:

1. A magnetic memory device comprising a magnetoresistive effect element, the magnetoresistive effect element comprising:

a first ferromagnetic layer;
a second ferromagnetic layer;
a layer stack arranged on a side opposite to the first ferromagnetic layer with respect to the second ferromagnetic layer;
a first non-magnetic layer arranged between the first ferromagnetic layer and the second ferromagnetic layer;
a second non-magnetic layer arranged between the second ferromagnetic layer and the layer stack; and
a third non-magnetic layer arranged on a side opposite to the second non-magnetic layer with respect to the layer stack and containing a metallic oxide, the third non-magnetic layer including an amorphous structure,
wherein the layer stack includes a fourth non-magnetic layer being in contact with the third non-magnetic layer and containing platinum (Pt).

2. The magnetic memory device according to claim 1, wherein the third non-magnetic layer contains gadolinium (Gd) or aluminum (Al).

3. The magnetic memory device according to claim 1, wherein the third non-magnetic layer contains an oxide of a metal element having an electronegativity lower than 1.8.

4. The magnetic memory device according to claim 1, wherein the layer stack further comprises:
a third ferromagnetic layer provided in contact with the fourth non-magnetic layer on a side opposite to the third non-magnetic layer with respect to the fourth non-magnetic layer;
a fifth non-magnetic layer provided in contact with the third ferromagnetic layer on a side opposite to the fourth non-magnetic layer with respect to the third ferromagnetic layer; and
a fourth ferromagnetic layer provided in contact with the fifth non-magnetic layer on a side opposite to the third ferromagnetic layer with respect to the fifth non-magnetic layer.

5. The magnetic memory device according to claim 4, wherein
the fifth non-magnetic layer contains platinum (Pt), and
the third ferromagnetic layer and the fourth ferromagnetic layer contain cobalt (Co).

6. The magnetic memory device according to claim 1, wherein the layer stack further comprises:
a third ferromagnetic layer provided in contact with the fourth non-magnetic layer on a side opposite to the third non-magnetic layer with respect to the fourth non-magnetic layer; and
a sub-layer stack provided in contact with the third ferromagnetic layer on a side opposite to the fourth non-magnetic layer with respect to the third ferromagnetic layer,
the sub-layer stack includes a plurality of sixth non-magnetic layers and a plurality of fifth ferromagnetic layers, and
the sub-layer stack has a layered structure in which the sixth non-magnetic layers and the fifth ferromagnetic layers are stacked in pairs, wherein a sixth non-magnetic layer and a fifth ferromagnetic layer in each of the pairs are stacked in this order from a side of the third ferromagnetic layer.

7. The magnetic memory device according to claim 6, wherein
the sixth non-magnetic layers contain platinum (Pt), and the third ferromagnetic layer and the fifth ferromagnetic layers contain cobalt (Co).

8. The magnetic memory device according to claim 1, wherein
the magnetoresistive effect element further includes a seventh non-magnetic layer in contact with the third non-magnetic layer on a side opposite to the layer stack with respect to the third non-magnetic layer, and
the seventh non-magnetic layer contains at least one compound selected from titanium nitride (TiN), hafnium nitride (HfN), zirconium nitride (ZrN), tantalum nitride (TaN), and tungsten nitride (WN).

9. The magnetic memory device according to claim 1, wherein
the magnetoresistive effect element further includes an eighth non-magnetic layer in contact with the third non-magnetic layer on a side opposite to the layer stack with respect to the third non-magnetic layer, and
the eighth non-magnetic layer contains at least one element selected from titanium (Ti), zirconium (Zr), hafnium (Hf), vanadium (V), niobium (Nb), tantalum (Ta), chromium (Cr), molybdenum (Mo), tungsten (W), carbon (C), silicon (Si), and germanium (Ge).

10. The magnetic memory device according to claim 9, wherein
the magnetoresistive effect element further includes a ninth non-magnetic layer in contact with the eighth non-magnetic layer on a side opposite to the third non-magnetic layer with respect to the eighth non-magnetic layer, and
the ninth non-magnetic layer contains at least one compound selected from titanium nitride (TiN), hafnium nitride (HfN), zirconium nitride (ZrN), tantalum nitride (TaN), and tungsten nitride (WN).

11. The magnetic memory device according to claim 1, wherein the second non-magnetic layer contains at least one element selected from ruthenium (Ru), osmium (Os), rhodium (Rh), iridium (Ir), vanadium (V), and chrome (Cr).

12. The magnetic memory device according to claim 1, wherein the first non-magnetic layer contains magnesium oxide (MgO).

13. The magnetic memory device according to claim 1, the device further comprising:
a substrate,
wherein the substrate, the third non-magnetic layer, the layer stack, the second non-magnetic layer, the second ferromagnetic layer, the first non-magnetic layer, and the first ferromagnetic layer are provided in this order in a direction perpendicular to the substrate.

14. A magnetic memory device comprising a magnetoresistive effect element,
the magnetoresistive effect element comprising:
a first ferromagnetic layer;
a second ferromagnetic layer;
a layer stack arranged on a side opposite to the first ferromagnetic layer with respect to the second ferromagnetic layer;
a first non-magnetic layer arranged between the first ferromagnetic layer and the second ferromagnetic layer;
a second non-magnetic layer arranged between the second ferromagnetic layer and the layer stack; and
a third non-magnetic layer arranged on a side opposite to the second non-magnetic layer with respect to the layer stack and containing a metallic oxide, the third non-magnetic layer including an amorphous structure, wherein the layer stack includes a fourth non-magnetic layer being in contact with the third non-magnetic layer and containing platinum (Pt), the fourth non-magnetic layer including a crystalline structure of a face-centered cubic in which a film surface in contact with the third non-magnetic layer is oriented on a (111) plane.

15. The magnetic memory device according to claim 14, wherein the third non-magnetic layer contains gadolinium (Gd) or aluminum (Al).

16. The magnetic memory device according to claim 14, wherein the third non-magnetic layer contains an oxide of a metal element having an electronegativity lower than 1.8.

17. The magnetic memory device according to claim 14, wherein the layer stack further comprises:

a third ferromagnetic layer provided in contact with the fourth non-magnetic layer on a side opposite to the third non-magnetic layer with respect to the fourth non-magnetic layer;

a fifth non-magnetic layer provided in contact with the third ferromagnetic layer on a side opposite to the fourth non-magnetic layer with respect to the third ferromagnetic layer; and a fourth ferromagnetic layer provided in contact with the fifth non-magnetic layer on a side opposite to the third ferromagnetic layer with respect to the fifth non-magnetic layer.

18. The magnetic memory device according to claim 17, wherein the fifth non-magnetic layer contains platinum (Pt), and the third ferromagnetic layer and the fourth ferromagnetic layer contain cobalt (Co).

19. The magnetic memory device according to claim 14, wherein the layer stack further comprises:

a third ferromagnetic layer provided in contact with the fourth non-magnetic layer on a side opposite to the third non-magnetic layer with respect to the fourth non-magnetic layer; and a sub-layer stack provided in contact with the third ferromagnetic layer on a side opposite to the fourth non-magnetic layer with respect to the third ferromagnetic layer, the sub-layer stack includes a plurality of sixth non-magnetic layers and a plurality of fifth ferromagnetic layers, and the sub-layer stack has a layered structure in which the sixth non-magnetic layers and the fifth ferromagnetic layers are stacked in pairs, wherein a sixth non-magnetic layer and a fifth ferromagnetic layer in each of the pairs are stacked in this order from a side of the third ferromagnetic layer.

* * * * *